United States Patent [19]
Anderson

[11] 4,367,883
[45] Jan. 11, 1983

[54] WHEELIE SUPPORT

[76] Inventor: Ray C. Anderson, 7605 S. Quebec, Tulsa, Okla. 74136

[21] Appl. No.: 198,846

[22] Filed: Oct. 20, 1980

Related U.S. Application Data

[63] Continuation-in-part of Ser. No. 191,124, Sep. 26, 1980.

[51] Int. Cl.³ .............................................. B62H 1/10
[52] U.S. Cl. ................................................... 280/301
[58] Field of Search ........... 280/293, 296, 304, 289 G, 280/239, 11.2, 87.04 A, 301, 302, 303

[56] References Cited

U.S. PATENT DOCUMENTS

| 359,127 | 3/1887 | Brusie | 280/293 |
| 863,675 | 8/1907 | Towle | 280/11.2 X |
| 1,154,089 | 9/1915 | Bryant | 280/296 |
| 4,149,735 | 4/1979 | Blackburn | 280/87.04 A |
| 4,153,268 | 5/1979 | Wilson | 280/304 |
| 4,154,452 | 5/1979 | Newman | 280/293 |

FOREIGN PATENT DOCUMENTS

| 895316 | 1/1945 | France | 280/293 |

Primary Examiner—John A. Pekar
Attorney, Agent, or Firm—Head, Johnson & Stevenson

[57] ABSTRACT

A device that allows support at an angle on a bicycle, motorcycle, skateboard or roller skates to enable the rider to perform a wheelie. Contact is on more than one point, namely the rear wheel and the wheelie support which offers stability. The wheelie support comprises a structural member pivotally connected to a cycle frame and extending forwardly of the rear wheel. A wheel or wheels are connected to the free end of the structural member, and operator controllable structure is provided to bring the wheel or wheels into engagement with the ground when the front wheel is raised off the ground.

3 Claims, 10 Drawing Figures

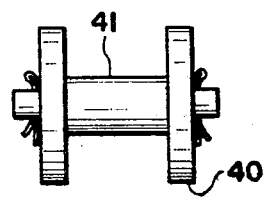
Fig.5
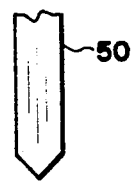
Fig.6
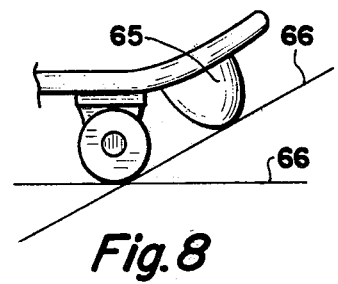
Fig.8
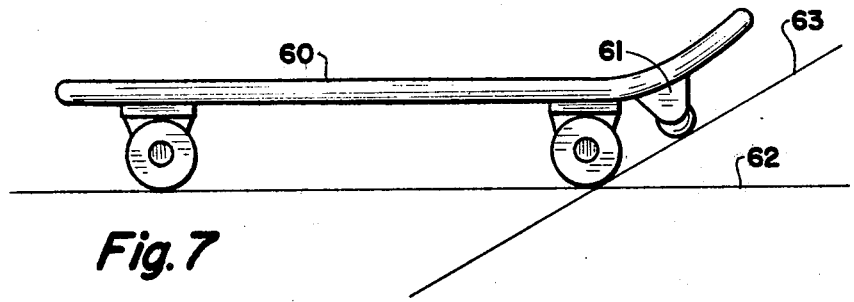
Fig.7
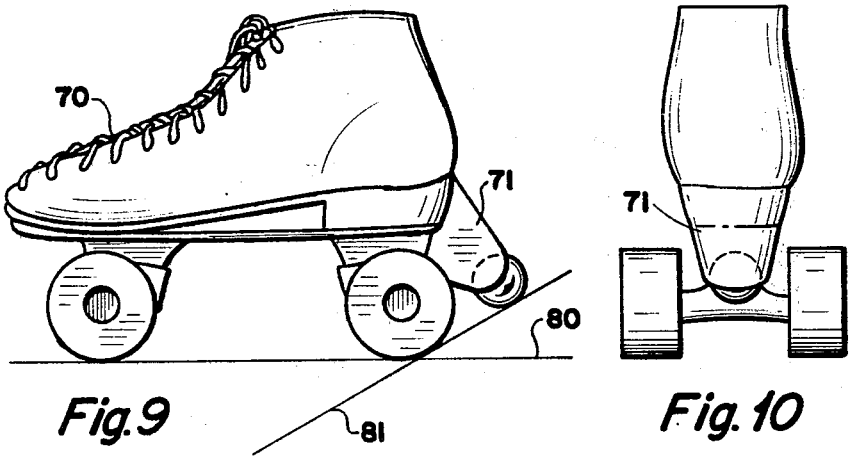
Fig.9
Fig.10

WHEELIE SUPPORT

This is a continuation-in-part of Application Ser. No. 191,124 filed Sept. 26, 1980.

BACKGROUND OF THE INVENTION

The invention relates generally to bicycles, motorcycles, skateboards and roller skates and more particularly to the function of performing a wheelie on such devices. Normally to achieve the correct angle for a wheelie in relationship to the center of balance for each rider requires a high amount of skill. This device allows the rider to simply power the vehicle up to the approximate angle and rest on the outboard wheelie support to achieve results.

SUMMARY OF THE INVENTION

It is an object of the present invention to provide a bicycle, motorcycle, skateboard or roller skates with an outboard support to enable the rider to perform a wheelie.

It is another object to provide a support using an additional wheel.

It is another object to provide a support using a sliding member in lieu of a wheel.

It is another object to provide a support using a rotating nondirectional ball caster to allow the device or vehicle wheel to not be effected in direction by the support wheel. Casters with wheel may also be used.

It is another object to provide a wheelie support on the front side of the rear wheel to stabilize the rider at various angles of tilt and not limited to one angle.

BRIEF DESCRIPTION OF DRAWINGS

FIG. 5 is a view showing two support wheels.

FIG. 6 is a view showing a small contact point wheel.

FIG. 7 is a side view of a wheelie support on a skateboard using ball caster.

FIG. 8 is a side view of a wheelie support on a skateboard using a sliding member.

FIG. 9 is a side view of a wheelie support on roller skates.

FIG. 10 is an end view of wheelie support on roller skates.

DESCRIPTION OF PREFERRED EMBODIMENT

Figure 2:
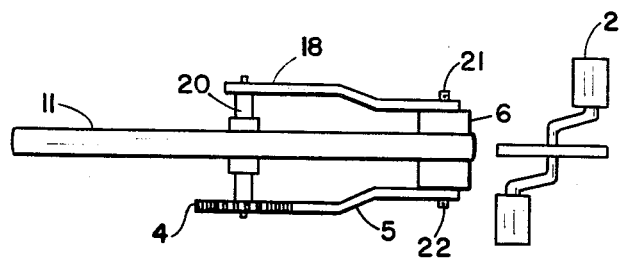
FIG. 2 is a top view of the wheelie support.
Figure 4:
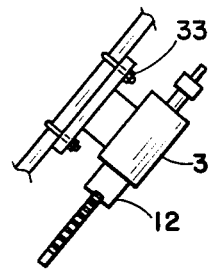
FIG. 4 is a side view of the locking mechanism.
Figure 3:
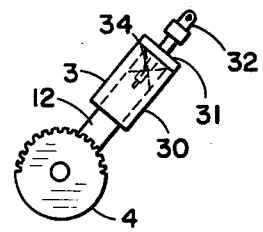
FIG. 3 is a front view of the locking mechanism.
Figure 1:
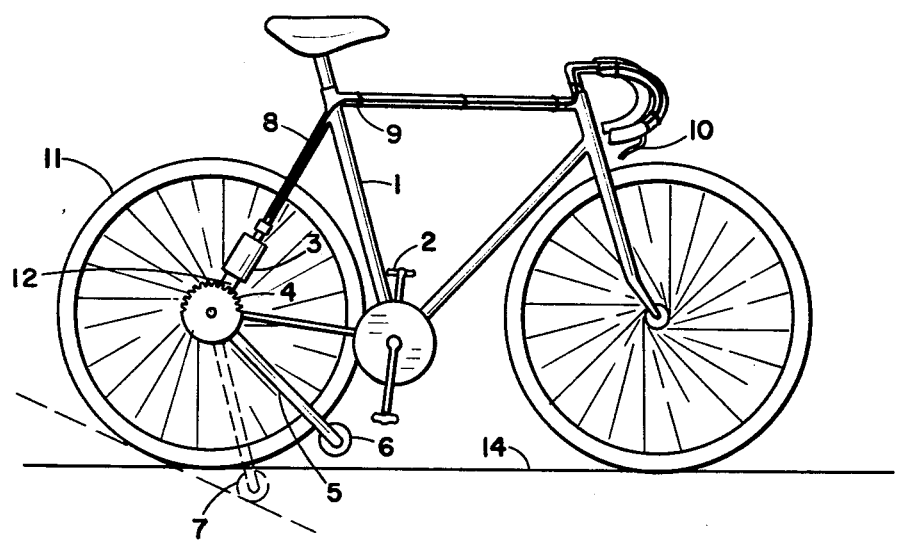
FIG. 1 is a schematic overall illustration of a wheelie support on a bicycle.

One method of the wheelie support is designated generally by the numeral 1 and is illustrated in schematic form in FIG. 1 and FIG. 2. The wheelie support 5 is shown mounted to the axle extension 20 and held in position by locking mechanism 3. The wheelie support consists of toothed plate 4, support bars 18, axle 21 and roller or wheel 6. The locking mechanism 3 consists of square tubing 30, toothed square locking bar 12, spring 34, retaining pull pin 32 and held to bicycle frame with U-bolts 33. A cable 8 is attached to retaining pull pin 32, held to bicycle frame with ties 9 and attached to hand lever 10.

Another method of the wheelie support is shown in FIG. 5. This method uses more than one wheel 40, for support and axle 41. A variation of wheel design is shown in FIG. 6, wheel 50.

Another method of the wheelie support is shown in FIG. 7. A skateboard 60 is shown with the wheelie support 61 mounted to the skateboard. The support, 61, can be a rotating ball, caster or wheel. A variation of wheelie support 65 is shown in FIG. 8. This is a non-rotating skid type support.

Another method of the wheelie support is shown in FIG. 9. Roller skates 70 is shown with wheelie support 71 shown attached. The type support can be of the wheel, ball, caster or skid type previously mentioned. FIG. 10 is an end view of the roller skate and wheelie support.

In operation the rider on the vehicle, bicycle or motorcycle, FIG. 1, depresses hand lever 10 which activates cable 8 attached to pull pin 32 and disengages locking bar 12 from toothed plate 4. This allows wheelie support 5 to fall with gravity to ground plane 14. The rider then powers the vehicle up to a wheelie angle, ground plane 15 and releases hand lever 10 which engages locking bar 12 into toothed plate 4. Gravity allows the wheelie support 5 to fall and also allows the wheelie wheel 6 to contact the ground plane 15. With this method various angles of wheelies can be accomplished. To release the mechanism the hand lever 10 is depressed which in turn disengages locking bar 12 from toothed plate 4 and gravity allows the system to fall to ground plane 14. To assist in disengagement of locking bar 12 from toothed plate 4, the rider may power the vehicle slightly up to a higher plane before depressing hand lever 10.

Referring now to FIG. 7 and FIG. 8, there is illustrated a modified form of the present invention. A wheelie support 61 is mounted to a skateboard 60 and the rider normally on ground plane 62 can power up to ground plane 63 to perform the wheelie with support.

Referring now to FIG. 9 and FIG. 10, there is illustrated a modified form of the present invention. A wheelie support 71 is mounted to a roller skate 70 and the skater normally on ground plane 80 can power up to ground plane 81 to perform the wheelie with support. It is to be understood that the ground planes before mentioned have different numeral designations but in fact the ground planes remain neutral while the vehicles change angularity.

It is to be understood that the embodiments shown and described are by way of example only and that many modifications can be made thereto without departing from the spirit of the invention. The invention is not to be construed as limited to the embodiments shown and described except insofar as the claims may be so limited.

I claim:

1. Apparatus for use with a wheel conveyance such as a bicycle or the like having at least one forward and one rearward wheel for rolling on a support surface in which the vehicle has a frame to which the forward and rearward wheels are rotatably supported, the apparatus providing means of adding stability to the vehicle when the front wheel is raised from the support surface, comprising:

a structural member affixed to said frame and extending in the plane of and forwardly of the vehicle rear wheel; and a third wheel rotatably supported at the outer end of said structural member, the third wheel being normally positioned above the support surface and arranged to engage the support surface by means controllable by the operator when the vehicle frame is pivoted to raise the front wheel from the support surface, the third wheel being between said rear wheel and said front wheel, enabling the user to balance the vehicle, at least for a limited period of time, on the rear wheel and the third wheel.

2. Apparatus according to claim 1 in which said third wheel is in the form of a pair of wheels on a common axis, the axis being supported to the outer end of said structural member.

3. Apparatus according to claim 1 including:
a circular ratchet secured to said structural member rearward end, the ratchet being supported to said conveyance about its rear wheel axis, and including means having a retractable stop member controllable by the operator, the stop member engaging the ratchet to retain the structural member in a selected angular position.

* * * * *